(12) United States Patent
Shoda et al.

(10) Patent No.: US 11,351,914 B2
(45) Date of Patent: Jun. 7, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Yasushi Shoda, Wako (JP); Junpei Noguchi, Wako (JP); Yuki Hara, Wako (JP); Ryoma Taguchi, Tokyo (JP); Yuta Takada, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 59 days.

(21) Appl. No.: 16/785,675

(22) Filed: Feb. 10, 2020

(65) Prior Publication Data

US 2020/0269749 A1    Aug. 27, 2020

(30) Foreign Application Priority Data

Feb. 26, 2019  (JP) .............................. JP2019-032716

(51) Int. Cl.
*B60Q 1/48* (2006.01)
*H04N 9/31* (2006.01)
*G08G 1/052* (2006.01)
*G06V 20/58* (2022.01)

(52) U.S. Cl.
CPC ............. *B60Q 1/486* (2013.01); *B60Q 1/484* (2013.01); *G06V 20/586* (2022.01); *G08G 1/052* (2013.01); *H04N 9/3185* (2013.01)

(58) Field of Classification Search
CPC .... B60Q 1/486; B60Q 1/484; G06K 9/00812; G08G 1/052; H04N 9/3185
See application file for complete search history.

(56) References Cited

U.S. PATENT DOCUMENTS

| | | | |
|---|---|---|---|
| 2015/0003085 A1* | 1/2015 | Yamasaki | F21S 41/663 362/465 |
| 2017/0368981 A1* | 12/2017 | Liken | B60Q 1/143 |
| 2018/0056851 A1* | 3/2018 | Kim | B60Q 1/143 |
| 2018/0173237 A1* | 6/2018 | Reiley | B60Q 1/525 |
| 2019/0118801 A1* | 4/2019 | Noh | G05D 1/0212 |
| 2019/0135342 A1* | 5/2019 | Inoue | B62D 15/027 |

FOREIGN PATENT DOCUMENTS

| | | |
|---|---|---|
| JP | 6362738 | 7/2018 |
| WO | 2017/104422 | 6/2017 |

OTHER PUBLICATIONS

Japanese Office Action for Japanese Patent Application No. 2019-032716 dated Apr. 5, 2022.

* cited by examiner

*Primary Examiner* — John W Miller
*Assistant Examiner* — Omer Khalid
(74) *Attorney, Agent, or Firm* — Amin, Turocy & Watson, LLP

(57) ABSTRACT

A vehicle control device is a vehicle control device mounted on a first vehicle, and the vehicle control device includes a light source configured to project light outside of a vehicle; and a light source controller configured to control the light source to project a projection image which is positioned outside the first vehicle viewed from above and is along at least part of a periphery of the first vehicle in a case where the first vehicle is stopped.

8 Claims, 12 Drawing Sheets

VEHICLE CONTROL DEVICE, VEHICLE CONTROL METHOD, AND STORAGE MEDIUM

CROSS-REFERENCE TO RELATED APPLICATION

This application claims priority to and the benefit from Japanese Patent Application No. 2019-32716, filed on Feb. 26, 2019, the contents of which are hereby incorporated by reference into the present application.

BACKGROUND OF THE INVENTION

Field of the Invention

The present invention relates to a vehicle control device, a vehicle control method, and a storage medium.

Description of Related Art

In recent years, research on automatic control of vehicles has been conducted. In automatic valet parking using this technology, a parking assistance device that determines a parking section by projecting light toward a place at which parking is scheduled when the illuminance around a vehicle is not sufficient, and guides a vehicle to a determined parking position has been disclosed (for example, refer to Japanese Patent No. 6362738).

In a parking lot in which automatic valet parking is performed as described above, if there are no parking frame lines that partition off parking spaces for each vehicle, or if parking frame lines are light, a driver of a vehicle that performs parking by manual driving may not see the parking frame lines and the vehicle may come into contact with a stopped vehicle.

The present invention has been made in view of such circumstances, and one of objectives thereof is to provide a vehicle control device, a vehicle control method, and a storage medium which can prevent other vehicles from coming into contact with a stopped vehicle.

SUMMARY OF THE INVENTION

A vehicle control device, a vehicle control method, and a storage medium according to the present invention have adopted the following configurations.

(1): A vehicle control device according to one aspect of the present invention is a vehicle control device mounted on a first vehicle, and includes a light source configured to project light outside of a vehicle; and a light source controller configured to control the light source to project a projection image which is positioned outside the first vehicle viewed from above and is along at least part of a periphery of the first vehicle in a case where the first vehicle is stopped.

(2): In the aspect of (1) described above, a recognizer configured to recognize whether a second vehicle is approaching the first vehicle, the light source controller is configured to control the light source to project the projection image in a case where the recognizer recognizes that the second vehicle is approaching the first vehicle.

(3): In the aspect of (2) described above, the projection image constitutes at least part of a rectangle shape, and the light source controller is configured to control the light source to project at least one of four sides of the rectangle in a case where the recognizer recognizes that the second vehicle is approaching the first vehicle.

(4): In the aspect of (2) or (3) described above, the recognizer is further configured to recognize whether the second vehicle is being manually driven, and the light source controller is configured to control the light source to project the projection image in a case where the recognizer recognizes that the second vehicle is approaching the first vehicle and the second vehicle is being manually driven.

(5): In the aspect of any one of (2) to (4) described above, the recognizer is further configured to recognize a vicinity situation of the first vehicle, and in a case where the recognizer recognizes that an object is present in a vicinity of a stop position of the first vehicle, the light source controller, is configured to control the light source not to perform a projection of the projection image within a range facing the object.

(6): In the aspect of any one of (2) to (5) described above, the recognizer is further configured to recognize a parking space in which the second vehicle to be park on the basis of an operation direction of the second vehicle, and the light source controller is configured to control the light source to project the projection image onto a side of the parking space recognized by the recognizer as viewed from the first vehicle.

(7): In the aspect of any one of (1) to (6) described above, the light source controller is configured to determine a projection position of the projection image on the basis of an interval between a third vehicle stopped to be adjacent to the first vehicle and the first vehicle.

(8): In the aspect of any one of (1) to (7) described above, the light source controller is configured to control the light source to project the projection image using visible light.

(9): In the aspect of any one of (1) to (8) described above, the light source controller is configured not to perform the projection of the projection image in a case where a parking lot in which the first vehicle is stopped is a parking lot dedicated to vehicles that automatically park.

(10): A vehicle control method according to another aspect of the present invention includes controlling, by a computer of a vehicle control device which is mounted on a first vehicle and comprises a light source, the light source to project a projection image which is positioned outside the first vehicle viewed from above and is along at least a part of a periphery of the first vehicle in a case where the first vehicle is stopped.

(11): A computer readable non-transitory storage medium according to still another aspect of the present invention stores a program which causes a computer of a vehicle control device that is mounted on a first vehicle and includes a light source to control the light source to project a projection image which is positioned outside the first vehicle viewed from above and is along at least a part of a periphery of the first vehicle in a case where the first vehicle is stopped.

According to (1) to (4), and (8) to (11), it is possible to prevent other vehicle from coming into contact with a stopped vehicle.

According to (5) and (6), it is possible to further suppress power consumption required for projection by restricting a projection range of a projection image to a necessary range.

According to (7), it is possible to further project a projection image onto a more appropriate position according to an environment and a vicinity situation of a parking lot by adjusting a projection position of a projection image.

DETAILED DESCRIPTION OF THE INVENTION

Hereinafter, embodiments of a vehicle control device, a vehicle control method, and a storage medium of the present invention will be described with reference to the drawings. In the following description, a case to which left-hand traffic rules are applied is described, but, when right-hand traffic rules are applied, the right and left may be read in reverse.

First Embodiment

[Overall Configuration]

Figure 1:
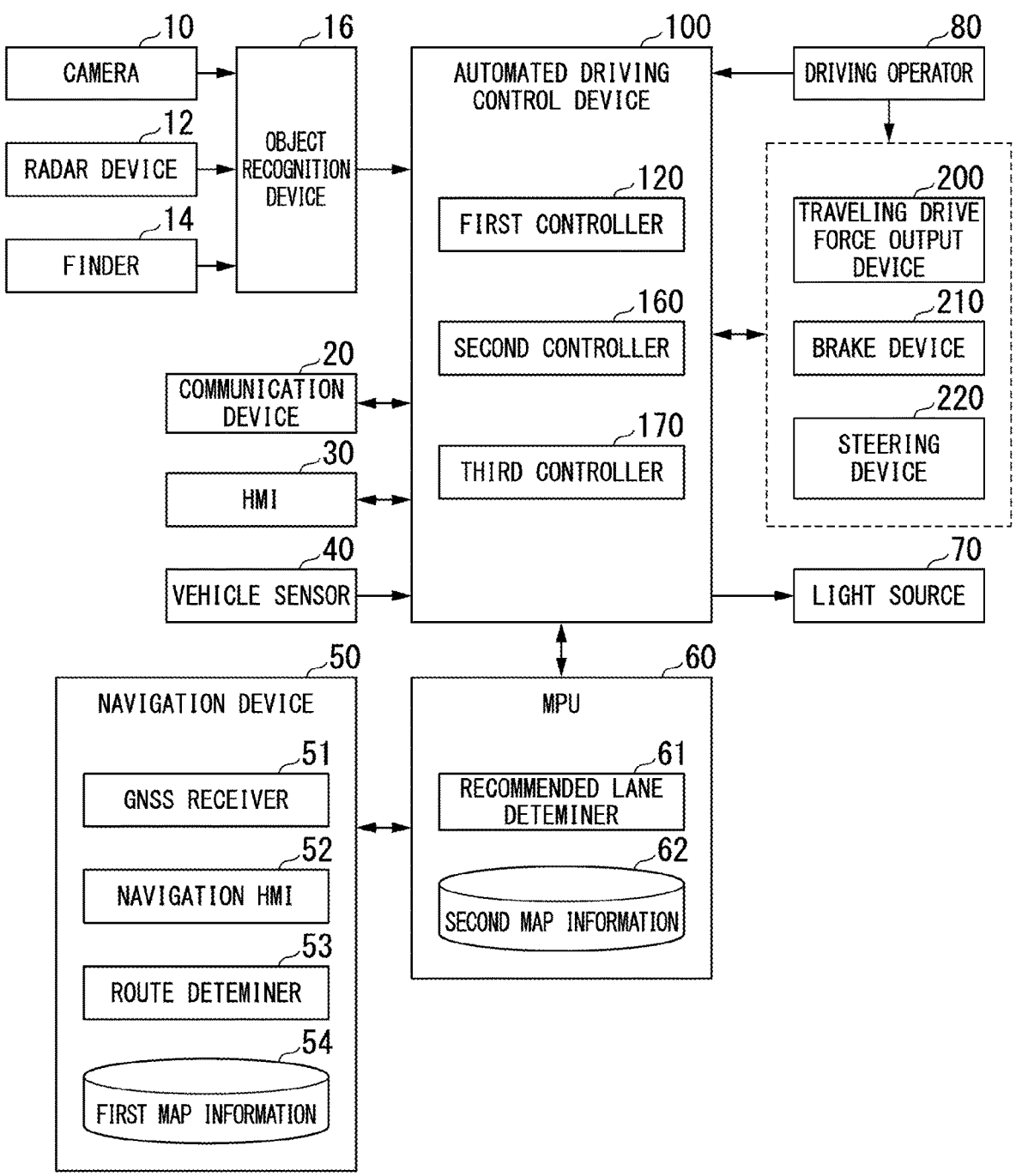
FIG. 1 is a configuration diagram of a vehicle system using a vehicle control device according to a first embodiment.

FIG. 1 is a configuration diagram of a vehicle system using a vehicle control device according to a first embodiment. A vehicle on which the vehicle system 1 is mounted is, for example, a two-wheel, three-wheel, or four-wheel vehicle. The driving source is an internal combustion engine such as a diesel engine or a gasoline engine, an electric motor, or a combination thereof. The electric motor operates using electric power generated by a generator connected to the internal combustion engine, or electric power discharged from a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a light source 70 (an example of a component of the "vehicle control device"), a driving operator 80, an automated driving control device 100 (an example of the "vehicle control device"), a traveling drive force output device 200, a brake device 210, and a steering device 220. These devices and apparatuses are connected to each other by a multiplex communication line such as a control area network (CAN) communication line, a serial communication line, a wireless communication network, or the like. Note that the configuration shown in FIG. 1 is merely an example, and a part of the configuration may be omitted or another configuration may be further added.

The camera 10 is, for example, a digital camera using a solid-state imaging device such as a charge coupled device (CCD) or a complementary metal oxide semiconductor (CMOS). The camera 10 is attached to an arbitrary position of a vehicle (hereinafter, a host vehicle M) on which the vehicle system 1 is mounted. When the front is imaged, the camera 10 is attached to an upper portion of a front windshield, a rear surface of a rearview mirror, or the like. The camera 10, for example, periodically and repeatedly captures an image around a host vehicle M. The camera 10 may be a stereo camera.

The radar device 12 radiates electric waves such as millimeter waves to the vicinity of the host vehicle M and detects at least a position (a distance and a direction) of an object by detecting electric waves (reflected waves) reflected against the object. The radar device 12 is attached to an arbitrary portion of the host vehicle M. The radar device 12 may detect the position and speed of the object according to a frequency modulated continuous wave (FM-CW) method.

The finder 14 is a light detection and ranging (LIDAR). The finder 14 emits light onto the vicinity of the host vehicle M and measures scattered light. The finder 14 detects a distance to a target on the basis of time from light emission to light reception. The light to be emitted is, for example, a pulsed laser light. The finder 14 is attached to an arbitrary portion of the host vehicle M.

The object recognition device 16 performs sensor fusion processing on results of detections performed by some or all of the camera 10, the radar device 12, and the finder 14, and recognizes a position, a type, a speed, and the like of an object. The object recognition device 16 outputs a result of the recognition to the automated driving control device 100. The object recognition device 16 may output results of detections performed by the camera 10, the radar device 12, and the finder 14 as they are to the automated driving control device 100. The object recognition device 16 may also be omitted from the vehicle system 1.

The communication device 20 communicates with other vehicles or parking lot management devices present in the vicinity of the host vehicle M, or various server devices using, for example, a cellular network, a Wi-Fi network, a Bluetooth (registered trademark), a dedicated short range communication (DSRC), or the like. Details of functions of the parking lot management device will be described below.

The HMI 30 presents various types of information to an occupant of the host vehicle M and receives an input operation from the occupant. The HMI 30 includes various display devices, speakers, buzzers, touch panels, switches, keys, and the like.

The vehicle sensor 40 includes a vehicle speed sensor that detects the speed of the host vehicle M, an acceleration sensor that detects acceleration, a yaw rate sensor that detects an angular speed around a vertical axis, an orientation sensor that detects a direction of the host vehicle M, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or supplemented by an inertial navigation system (INS) using an output of the vehicle sensor 40. The navigation HMI 52 includes a display device, a speaker, a touch panel, keys, and the like. The navigation HMI 52 may be partially or entirely shared with HMI 30 described above. The route determiner 53 determines, for example, a route (hereinafter, referred to as a route on a map) from the position of the host vehicle M identified by the GNSS receiver 51 (or any input arbitrary position) to a destination input by the occupant using the navigation HMI 52 with reference to the first map information 54. The first map information 54 is, for example, information in which a road shape is expressed by a link indicating a road and a node connected by the link. The first map information 54 may include a curvature of a road, point of interest (POI) information, and the like. The route on a map is output to the MPU 60. The navigation device 50 may perform route guidance using the navigation HMI 52 on the basis of the route on a map. The navigation device 50 may also be realized by, for example, a function of a terminal device such as a smartphone or a tablet terminal owned by the occupant. The navigation device 50 may transmit a current position and a destination to the navigation server via the communication device 20, and acquire a route equivalent to the route on a map from the navigation server.

The MPU 60 includes, for example, a recommended lane determiner 61 and holds second map information 62 in the storage device such as an HDD or a flash memory. The recommended lane determiner 61 divides the route on a map provided from the navigation device 50 into a plurality of blocks (for example, divides every 100 [m] in a vehicle traveling direction), and determines a recommended lane for each block with reference to the second map information 62. The recommended lane determiner 61 determines which numbered lane to travel from the left. The recommended lane determiner 61 determines a recommended lane such that, when there is a branch portion in the route on a map, the host vehicle M can travel in a reasonable route for proceeding to a branch destination.

The second map information 62 is map information that has higher precision than the first map information 54. The second map information 62 includes, for example, information on a center of a lane, information on boundaries of a lane, and the like. The second map information 62 may include road information, traffic regulation information, address information (addresses and postal codes), facility information, telephone number information, and the like. The second map information 62 may be updated at any time by the communication device 20 communicating with another device.

The light source 70 projects light (an example of a "projection image") onto an outside of the host vehicle M. The light source 70 projects a light beam (parking line) indicating a parking space of the host vehicle M that is in a parking standby state. The parking standby state indicates a state in which the host vehicle M has completed parking and the host vehicle M stops in a parking space. The light source 70 is positioned outside the host vehicle M when the host vehicle M is viewed from above and projects a parking line along at least part of a periphery of the host vehicle M. The parking line along at least part of the periphery of the host vehicle M may or may not be parallel to an outer edge of the host vehicle M. The parking line is, for example, visible light. The parking line may have an arbitrary line shape such as a solid line, a dashed line, and a double line. An occupant of other vehicle that attempts to park in a parking space (an adjacent parking space) adjacent to the parking space of the host vehicle can recognize the parking space of the host vehicle M by recognizing a parking line projected by the light source 70 of the host vehicle M. As a result, it is possible to prevent other vehicle from coming into contact with the host vehicle M that is in the parking standby state. For example, the light source 70 projects at least one of four sides of a rectangle larger than an outer size of the host vehicle M to the periphery of the host vehicle M when the host vehicle M is viewed from above.

Figure 2:
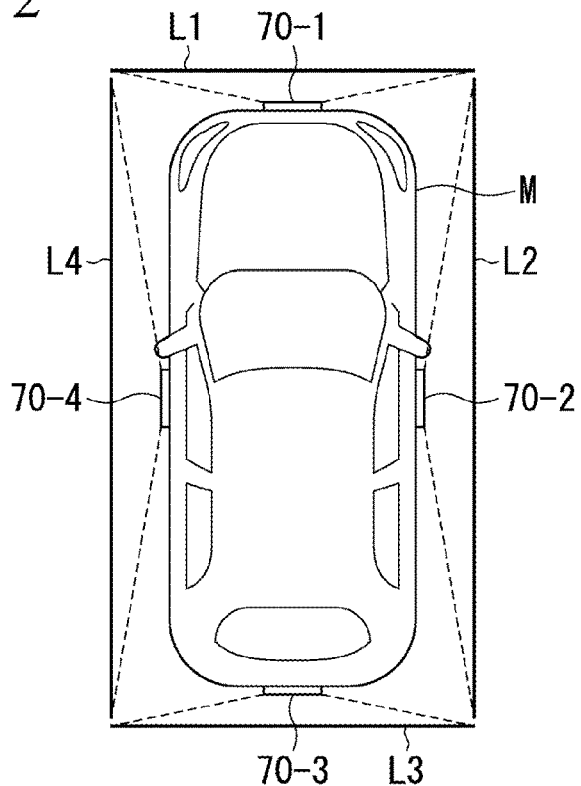
FIG. 2 is a diagram which shows an example of projection processing performed by a light source according to the first embodiment.

FIG. 2 is a diagram which shows an example of projection processing performed by the light source 70 according to the first embodiment. As shown in FIG. 2, the light source 70 includes, for example, when the host vehicle M is viewed from above, a light source 70-1 that is disposed in front of the host vehicle M and projects a parking line L1 onto a ground surface in front of the host vehicle M, a light source 70-2 that is disposed on a right side of the host vehicle M and projects a parking line L2 onto a ground surface on a right side of the host vehicle M, a light source 70-3 that is disposed behind the host vehicle M and projects a parking line L3 onto a ground surface behind the host vehicle M, and a light source 70-4 that is disposed on a left side of the host vehicle M and projects a parking line L4 onto a ground surface on a left side of the host vehicle M. Note that the number and the disposition places of the light sources 70 are arbitrary. For example, the light source 70 may be disposed on a roof of the host vehicle M or on a bottom of a vehicle body of the host vehicle M.

The light source 70 can control the position of a parking line to be projected. For example, the light source 70 includes a movable mechanism for adjusting a direction of the light source 70, and thereby projecting the parking line onto a position away from the host vehicle M by an arbitrary distance.

The driving operator 80 includes, for example, an accelerator pedal, a brake pedal, a shift lever, a steering wheel, a modified steering wheel, a joystick, and other operators. A sensor that detects an operation amount or the presence or absence of an operation is attached to the driving operator 80, and a result of the detection is output to the automated driving control device 100 or some or all of the traveling drive force output device 200, the brake device 210, and the steering device 220.

The automated driving control device 100 includes, for example, a first controller 120, a second controller 160, and a third controller 170. Each of the first controller 120, the second controller 160, and the third controller 170 are realized by, for example, a hardware processor such as a central processing unit (CPU) executing a program (software). Some or all of these components may be realized by hardware (circuit unit; including circuitry) such as large scale integration (LSI), an application specific integrated circuit (ASIC), a field-programmable gate array (FPGA), or a graphics processing unit (GPU), and may also be realized by cooperation of software and hardware. The program may be stored in advance in a storage device (a storage device including a non-transitory storage medium) such as an HDD or a flash memory of the automated driving control device 100, and may also be stored in a detachable storage medium such as a DVD or a CD-ROM and installed in the HDD or flash memory of the automated driving control device 100 by the storage medium (the non-transitory storage medium) being mounted on a drive device.

Figure 3:
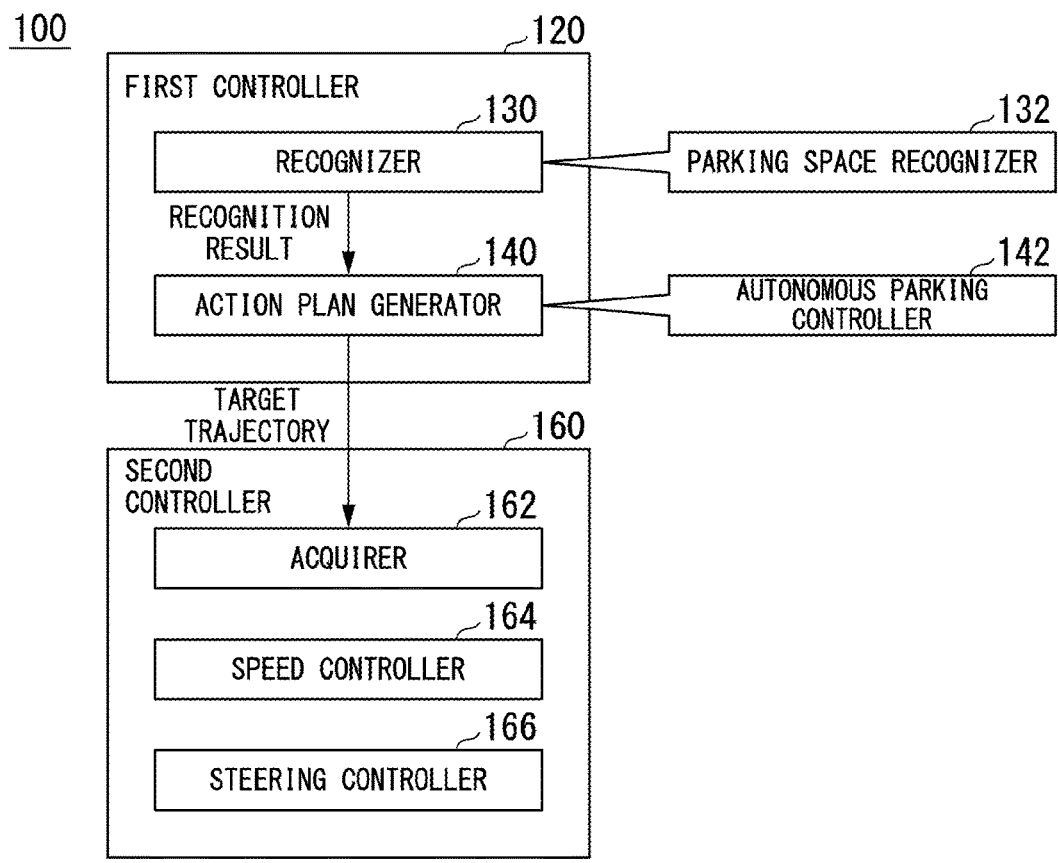
FIG. 3 is a functional configuration diagram of a first controller and a second controller according to the first embodiment.

FIG. 3 is a functional configuration diagram of the first controller 120 and the second controller 160 according to the first embodiment. The first controller 120 includes, for example, a recognizer 130 and an action plan generator 140. The first controller 120 realizes, for example, a function based on artificial intelligence (AI) and a function based on a model given in advance in parallel. For example, a function of "recognizing an intersection" is realized by executing recognition of an intersection by deep learning or the like and recognition based on a condition given in advance (a signal that can be subjected to pattern matching such as a road sign) in parallel and comprehensively evaluating the both by scoring them. As a result, a reliability of automated driving is secured.

The recognizer 130 recognizes states such as the position, speed, and acceleration of an object in the vicinity of the host vehicle M on the basis of information input from the camera 10, the radar device 12, and the finder 14 via the object recognition device 16. The position of an object is recognized as, for example, a position on absolute coordinates with a representative point (a center of gravity, a center of a drive shaft, or the like) of the host vehicle M set as an origin and is used for control. The position of an object may be represented by a representative point such as the center of gravity or a corner of the object, or may be represented by an expressed area. The "states" of an object may include acceleration, a jerk, or an "action state" (for example, whether a lane change is being performed or is intended to be performed) of the object.

The recognizer 130 recognizes, for example, a lane (a traveling lane) in which the host vehicle M is traveling. For example, the recognizer 130 recognizes a traveling lane by comparing a pattern of a road marking line (for example, an array of solid lines and dashed lines) obtained from the second map information 62 with a pattern of a road marking line in the vicinity of the host vehicle M recognized from an image captured by the camera 10. The recognizer 130 may recognize a traveling lane by recognizing not only a road marking line but also a traveling path boundary (road boundary) including road marking lines, shoulders, curbs, median strips, guardrails, and the like. In this recognition, a position of the host vehicle M acquired from the navigation device 50 and a result of processing performed by an INS may be added. The recognizer 130 recognizes temporary stop lines, obstacles, red lights, toll booths, and other road events.

When a traveling lane is recognized, the recognizer 130 recognizes the position and posture of the host vehicle M with respect to the traveling lane. The recognizer 130 may recognize, for example, a deviation of a reference point of the host vehicle M from a center of the lane and an angle formed with respect to a line connecting centers of the lane in a traveling direction of the host vehicle M as a relative position and a posture of the host vehicle M with respect to the traveling lane. Instead of this, the recognizer 130 may also recognize a position of the reference point or the like of the host vehicle M with respect to any side end (a road marking line or road boundary) of the traveling lane as the relative position of the host vehicle M with respect to the traveling lane.

The recognizer 130 includes a parking space recognizer 132 that is started in an autonomous parking event to be described below. Details of functions of the parking space recognizer 132 will be described below.

The action plan generator 140 generates a target trajectory in which the host vehicle M travels a recommended lane determined by the recommended lane determiner 61 in principle and will automatically (independent of an operation of a driver) travel in the future to be able to cope with the vicinity situation of the host vehicle M. The target trajectory includes, for example, a speed element. For example, the target trajectory is expressed as a sequential arrangement of points (trajectory points) that the host vehicle M needs to reach. The trajectory point is a point that the host vehicle M needs to reach every predetermined traveling distance (for example, about several [m]) on a road, and separately from this, a target speed and target acceleration for every predetermined sampling time (for example, about a fraction of [sec]) are generated as part of the target trajectory. The trajectory point may be a position that the host vehicle M needs to reach at a corresponding sampling time for each predetermined sampling time. In this case, information on the target speed and the target acceleration is expressed by an interval between trajectory points.

The action plan generator 140 may set an automated driving event in generation of a target trajectory. Examples of the automated driving event include a constant-speed traveling event, a low-speed following traveling event, a lane change event, a branching event, a joining event, a takeover event, an autonomous parking event in which parking is performed by unmanned traveling in valet parking, and the like. The action plan generator 140 generates a target trajectory in accordance with a started event. The action plan generator 140 includes an autonomous parking controller 142 that starts when the autonomous parking event is executed. Details of functions of the autonomous parking controller 142 will be described below.

The second controller 160 controls the traveling drive force output device 200, the brake device 210, and the steering device 220 such that the host vehicle M passes through the target trajectory generated by the action plan generator 140 at a scheduled time.

Returning to FIG. 3, the second controller 160 includes, for example, an acquirer 162, a speed controller 164, and a steering controller 166. The acquirer 162 acquires information on the target trajectory (trajectory points) generated by the action plan generator 140, and causes a memory (not shown) to store it. The speed controller 164 controls the traveling drive force output device 200 or the brake device 210 on the basis of a speed element associated with the target trajectory stored in the memory. The steering controller 166 controls the steering device 220 in accordance with a bending of the target trajectory stored in the memory. Processing performed by the speed controller 164 and the steering controller 166 is realized by, for example, a combination of feedforward control and feedback control. As an example, the steering controller 166 executes a combination of the feedforward control in accordance with a curvature of a road ahead of the host vehicle M and the feedback control based on a deviation from the target trajectory.

The traveling drive force output device 200 outputs a traveling drive force (torque) for driving a vehicle to drive wheels. The traveling drive force output device 200 includes, for example, a combination of an internal combustion engine, an electric motor, a transmission, and the like, and an electronic control unit (ECU) that controls these. The ECU controls the constituents described above according to information input from the second controller 160 or information input from the driving operator 80.

The brake device 210 includes, for example, a brake caliper, a cylinder that transmits a hydraulic pressure to the brake caliper, an electric motor that causes the cylinder to generate the hydraulic pressure, and a brake ECU. The brake ECU controls the electric motor according to the information input from the second controller 160 or the information input from the driving operator 80 and outputs a brake torque in accordance with a braking operation to each vehicle wheel. The brake device 210 may include a mechanism that transmits the hydraulic pressure generated by an operation of a brake pedal included in the driving operator 80 to the cylinder via a master cylinder as a backup. The brake device 210 is not limited to the constituent described above, and may be an electronic control-type hydraulic pressure brake device that controls an actuator according to the information input from the second controller 160 and transmits the hydraulic pressure of the master cylinder to the cylinder.

The steering device 220 includes, for example, a steering ECU and an electric motor. The electric motor changes a direction of a steering wheel by, for example, applying a force to a rack and pinion mechanism. The steering ECU drives the electric motor according to the information input from the second controller 160 or the information input from the driving operator 80 and causes the direction of a steering wheel to be changed.

[Autonomous Parking Event—at the Time of Entering]

Figure 4:
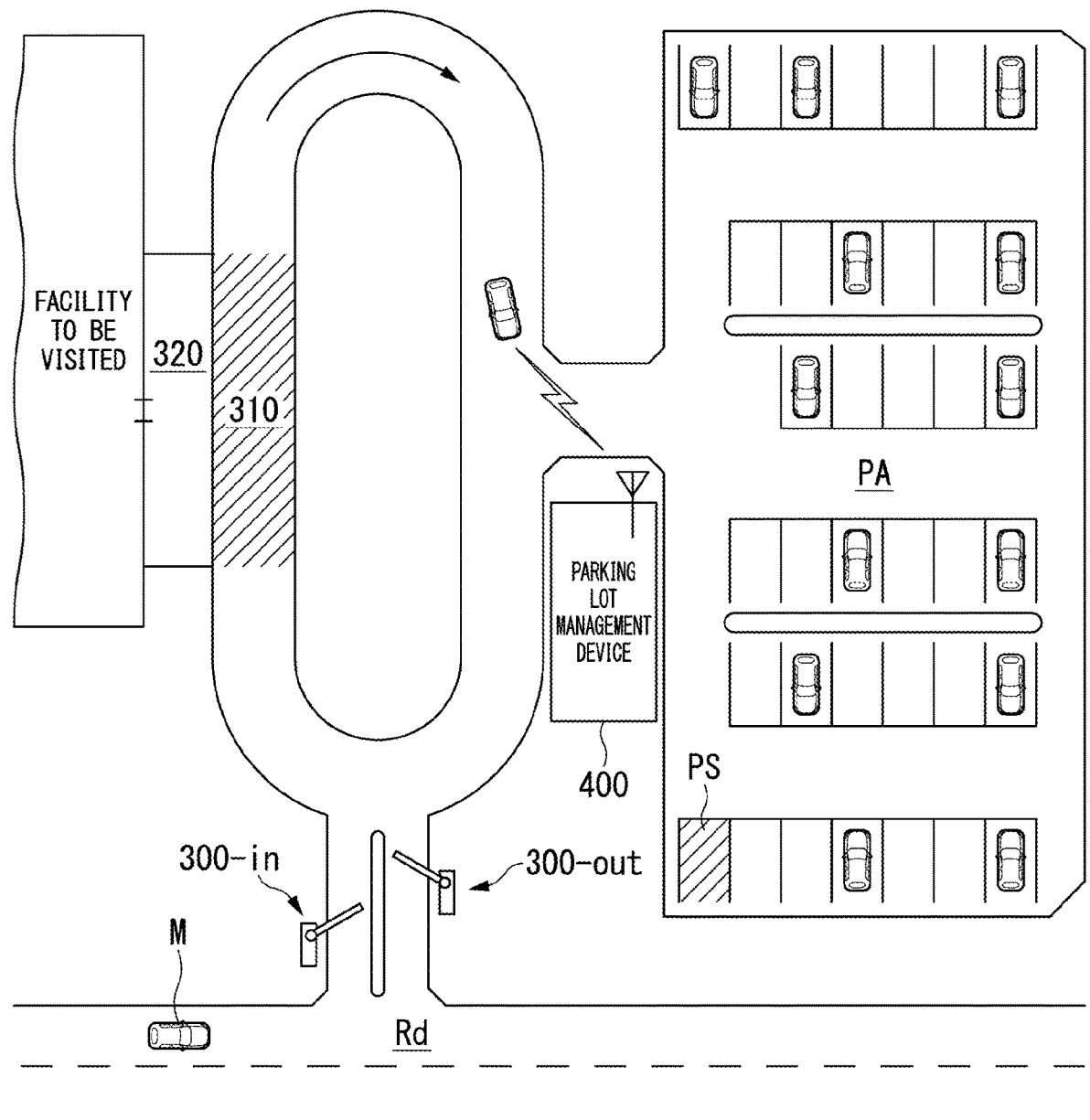
FIG. 4 is a diagram which schematically shows a scene in which an autonomous parking event according to the first embodiment is executed.

The autonomous parking controller 142 causes the host vehicle M to park in a parking space on the basis of, for example, information acquired from a parking lot management device 400 by the communication device 20. FIG. 4 is a diagram which schematically shows a scene in which the autonomous parking event according to the first embodiment is executed. In a route from a road Rd to a facility to be visited, gates 300-in and 300-out are provided. The host vehicle M passes through the gate 300-in and proceeds to a stop area 310 by manual driving or automated driving. The stop area 310 faces a getting-on/off area 320 connected to the facility to be visited. An eave for avoiding rain and snow is provided in the getting-on/off area 320.

The host vehicle M performs automated driving in an unmanned state after dropping the occupant at the stop area 310 and starts an autonomous parking event of moving to a parking space PS in a parking lot PA. A starting trigger of the autonomous parking event may be, for example, any operation by the occupant, or may be a predetermined signal wirelessly received from the parking lot management device 400. The autonomous parking controller 142 controls the communication device 20 such that it transmits a parking request to the parking lot management device 400 when the autonomous parking event is started. Then, the host vehicle M moves from the stop area 310 to the parking lot PA in accordance with a guidance of the parking lot management device 400 or while performing detection by itself.

Figure 5:
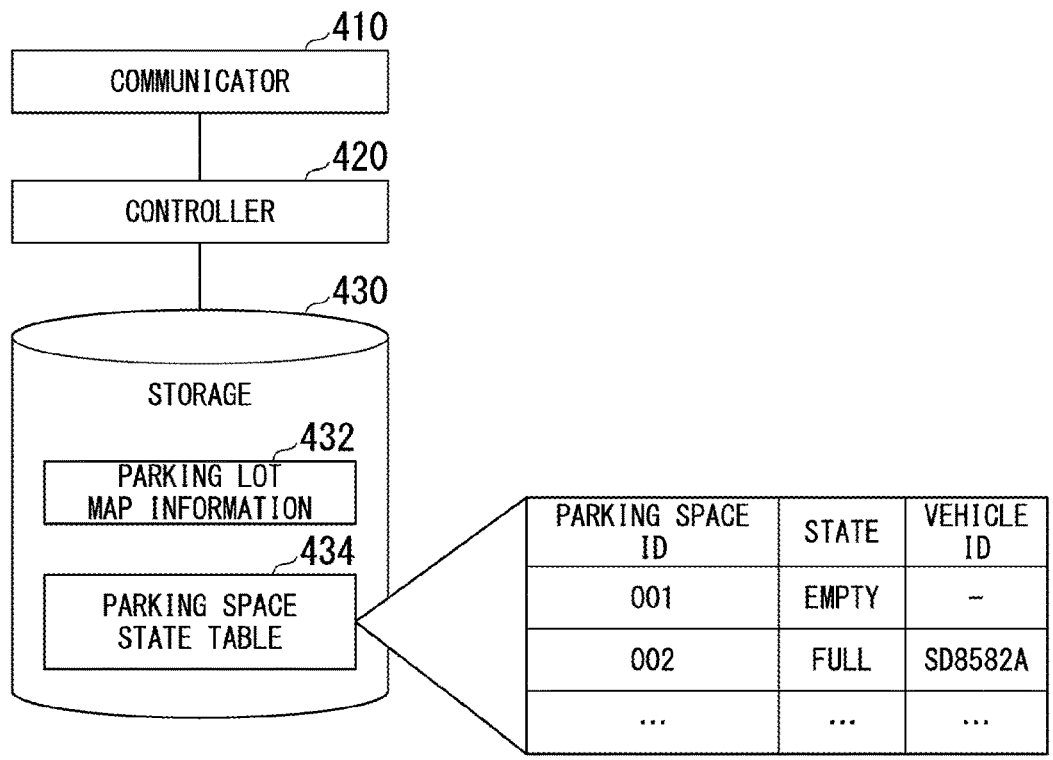
FIG. 5 is a diagram which shows an example of a configuration of a parking lot management device according to the first embodiment.

FIG. 5 is a diagram which shows an example of a configuration of the parking lot management device 400 according to the first embodiment. The parking lot management device 400 includes, for example, a communicator 410, a controller 420, and a storage 430. The storage 430 stores information such as parking lot map information 432 and a parking space state table 434.

The communicator 410 wirelessly communicates with the host vehicle M and other vehicles. The controller 420 guides the vehicles to the parking space PS on the basis of information acquired by the communicator 410 and the information stored in the storage 430. The parking lot map information 432 is information that geometrically represents a structure of the parking lot PA. The parking lot map information 432 includes coordinates for each parking space PS. In the parking space state table 434, for example, a state indicating whether a space is in an empty state or full (parking standby) state and a vehicle ID that is identification information of a vehicle in the parking standby state when a space is in the full state are associated with a parking space ID that is identification information of a parking space PS.

If the communicator 410 receives a parking request from a vehicle, the controller 420 extracts a parking space PS whose state is empty with reference to the parking space state table 434, acquires a position of the extracted parking space PS from the parking lot map information 432, and transmits a suitable route to the acquired position of the parking space PS to the vehicle using the communicator 410. In addition, the controller 420 instructs a specific vehicle to stop or slow down when necessary on the basis of a positional relationship between a plurality of vehicles to prevent vehicles from proceeding to the same position at the same time.

In the vehicle which has received a route (hereinafter, assumed to be the host vehicle M), the autonomous parking controller 142 generates a target trajectory based on the route. If a target parking space PS is has been approached, the parking space recognizer 132 recognizes parking frame lines and the like that partition off the parking space PS and recognizes a detailed position of the parking space PS to provide the position to the autonomous parking controller 142. The autonomous parking controller 142 corrects the target trajectory by receiving this and causes the host vehicle M to park in the parking space PS.

[Autonomous Parking Event—at the Time of Exit]

The autonomous parking controller 142 and the communication device 20 maintain an operating state even when the host vehicle M is in the parking standby state. The autonomous parking controller 142 causes a system of the host vehicle M to start and causes the host vehicle M to move to the stop area 310, for example, when the communication device 20 has received a pick-up request from a terminal device of an occupant. At this time, the autonomous parking controller 142 controls the communication device 20 such that it transmits a departure request to the parking lot management device 400. The controller 420 of the parking lot management device 400, similarly to the time of entrance, instructs a specific vehicle to stop or slow down when necessary on the basis of the positional relationship between a plurality of vehicles to prevent vehicles from proceeding to the same position at the same time. If the host vehicle M is moved to the stop area 310 and allows the occupant to get thereon, the autonomous parking controller 142 stops operating and, thereafter, manual driving or automated driving using a separate functional unit started.

Not being limited to the above description, the autonomous parking controller 142 may independently find an empty parking space on the basis of a result of detection performed by the camera 10, the radar device 12, the finder 14, or the object recognition device 16 without depending on communication and cause the host vehicle M to park in the parking space found.

[Parking Waiting Event]

Figure 6:
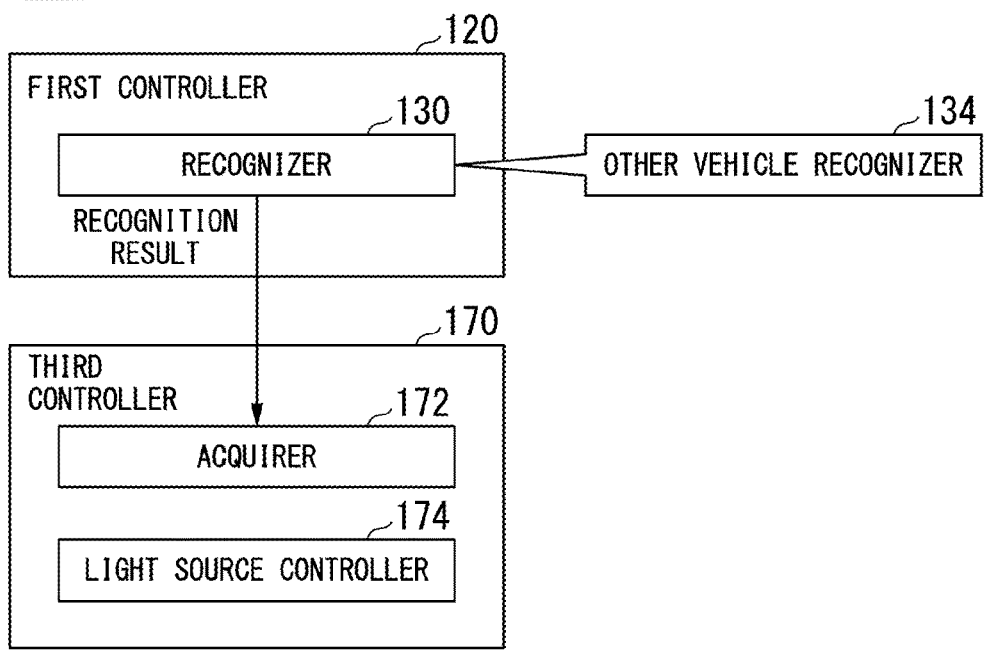
FIG. 6 is a functional configuration diagram of the first controller and a third controller according to the first embodiment.

FIG. 6 is a functional configuration diagram of the first controller 120 and the third controller 170 according to the first embodiment. The recognizer 130 included in the first controller 120 includes other vehicle recognizer 134 which starts in a parking waiting event. The other vehicle recognizer 134 recognizes other vehicle m (an example of the "second vehicle") that parks in an adjacent parking space which is adjacent to a parking space of the host vehicle M (an example of the "first vehicle") on the basis of the information input from the camera 10, the radar device 12, and the finder 14 via the object recognition device 16. For example, the other vehicle recognizer 134 recognizes whether other vehicle m approaches the host vehicle M that is in the parking standby state.

For example, the other vehicle recognizer 134 may determine whether other vehicle m is approaching on the basis of presence or absence of intrusion by the other vehicle m within a predetermined distance (for example, within a radius) based on the position (a parking position, a stop position) of the host vehicle M. Alternatively, the other vehicle recognizer 134 may recognize whether other vehicle m is approaching on the basis of the presence or absence of intrusion by the other vehicle m within a predetermined distance (for example, within a radius) based on a position of an adjacent parking space in the empty state. The other vehicle recognizer 134 outputs a result of recognition of other vehicle m to the third controller 170. Note that the other vehicle recognizer 134 may recognize the presence or absence of other vehicle m that parks in the adjacent parking space on the basis of information on a speed of the other vehicle m (whether the speed has been reduced sufficiently to perform parking) and a direction of the operation (whether a traveling direction of the other vehicle m is toward the adjacent parking space), in addition to the information on the distance described above, to distinguish between the other vehicle m that parks in the adjacent parking space and the other vehicle m that only passes near the host vehicle M on the basis of a result of recognizing the other vehicle m by the other vehicle recognizer 134.

The third controller 170 controls the light source 70 such that the light source projects a projection image which is positioned outside the host vehicle M when the host vehicle M is viewed from above and is along at least part of a periphery of the host vehicle M on the basis of a result of the recognition the other vehicle m performed by the other vehicle recognizer 134.

The third controller 170 includes, for example, an acquirer 172 and a light source controller 174. The acquirer 172 acquires the recognition result of other vehicle m by the other vehicle recognizer 134 and causes it to be stored in a memory (not shown). When the host vehicle M is stopped, the light source controller 174 controls the light source 70 such that the light source projects a projection image which is positioned outside the host vehicle M when the host vehicle M is viewed from above and is along at least part of a periphery of the host vehicle M when the host vehicle M is stopped. When the recognition result of other vehicle by the other vehicle recognizer 134 indicates that the other vehicle m is approaching, the light source controller 174 controls the light source 70 such that the light source projects a projection image which is positioned outside the host vehicle M when the host vehicle M is viewed from above and is along at least part of a periphery of the host vehicle M. The light source controller 174 controls the light source 70 such that the parking line described above is projected using visible light. For example, the light source controller 174 controls the light source 70 such that at least one of the four sides of a rectangle larger than the outer size of the host vehicle M is projected onto the periphery of the host vehicle M when the host vehicle M is viewed from above. In the example shown in FIG. 2, the light source controller 174 controls the light sources 70-1 to 70-4 such that at least one of the parking lines L1 to L4 is projected.

[Operation Flow of Parking Waiting Event]

Figure 7:
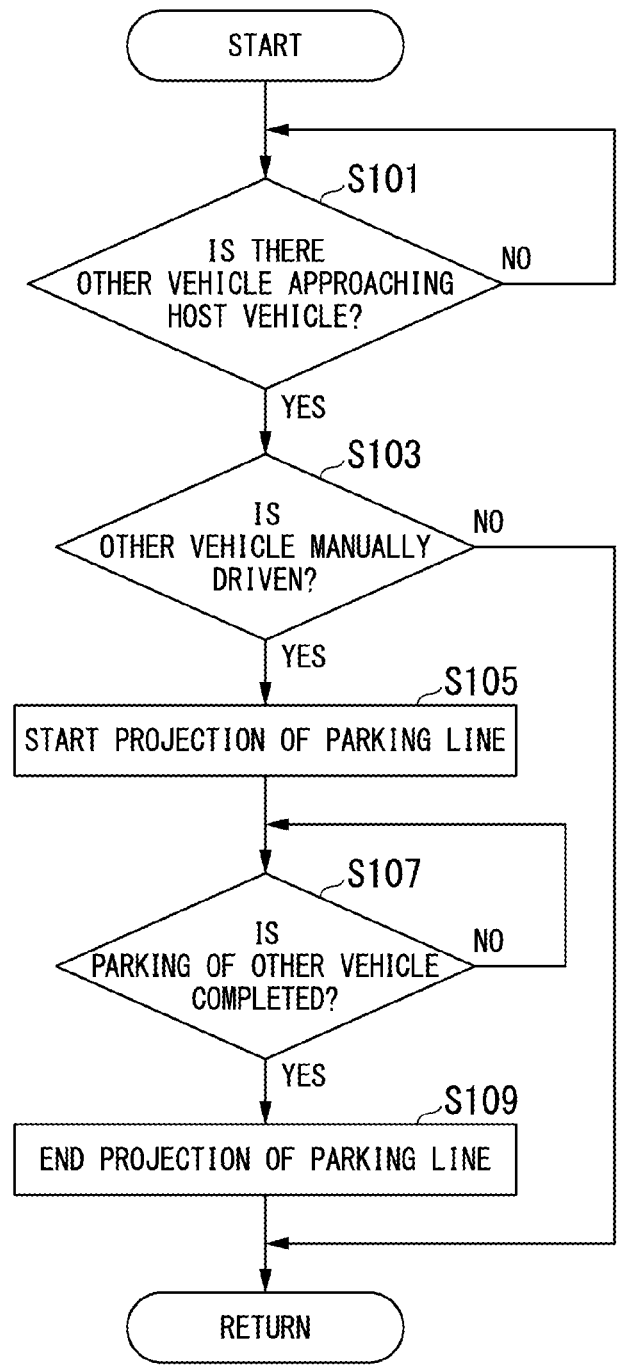
FIG. 7 is a diagram which shows an example of an operation flow of a parking waiting event of an automated driving control device according to the first embodiment.

An operation of the parking waiting event as described above will be described. FIG. 7 is a diagram which shows an example of an operation flow of the parking waiting event of the automated driving control device 100 according to the first embodiment. First, the other vehicle recognizer 134 recognizes whether other vehicle m is approaching the host vehicle M on the basis of the information input from the camera 10, the radar device 12, and the finder 14 via the object recognition device 16 (step S101). When it is recognized that other vehicle m is not approaching the host vehicle M, the other vehicle recognizer 134 continues to monitor the other vehicle m and recognizes whether the other vehicle m is approaching the host vehicle M.

On the other hand, when it is recognized that other vehicle m is approaching the adjacent parking space, the other vehicle recognizer 134 further recognizes whether an approaching other vehicle m is being manually driven (step S103). The recognition of whether the vehicle is being manually driven, that is, recognition of whether manual driving or automated driving is being performed in the vehicle, is performed by, for example, confirming a driving state of the other vehicle m by communication between the host vehicle M and the other vehicle m, and confirming whether an occupant is present in the other vehicle m on the basis of an image captured by the camera 10, whether the other vehicle is in a hands-off state, and the like. When it is recognized that the approaching other vehicle m is not being manually driven, the other vehicle recognizer 134 recognizes whether the other vehicle m is approaching the host vehicle M again without performing subsequent processing of the present flowchart (step S101). Note that the other vehicle recognizer 134 may not perform recognition of whether the vehicle is being manually driven described above.

On the other hand, when it is recognized that the other vehicle m is being manually driven by the other vehicle recognizer 134, the light source controller 174 controls the light source 70 such that the light source projects a projection image which is positioned outside the host vehicle M when the host vehicle M is viewed from above and is along at least part of a periphery of the host vehicle M and starts a projection of the parking line (step S105). For example, the light source controller 174 controls the light source 70 such that a parking line of a rectangle larger than the outer size of the host vehicle M is projected onto the periphery of the host vehicle M when the host vehicle M is viewed from above.

Figure 8:
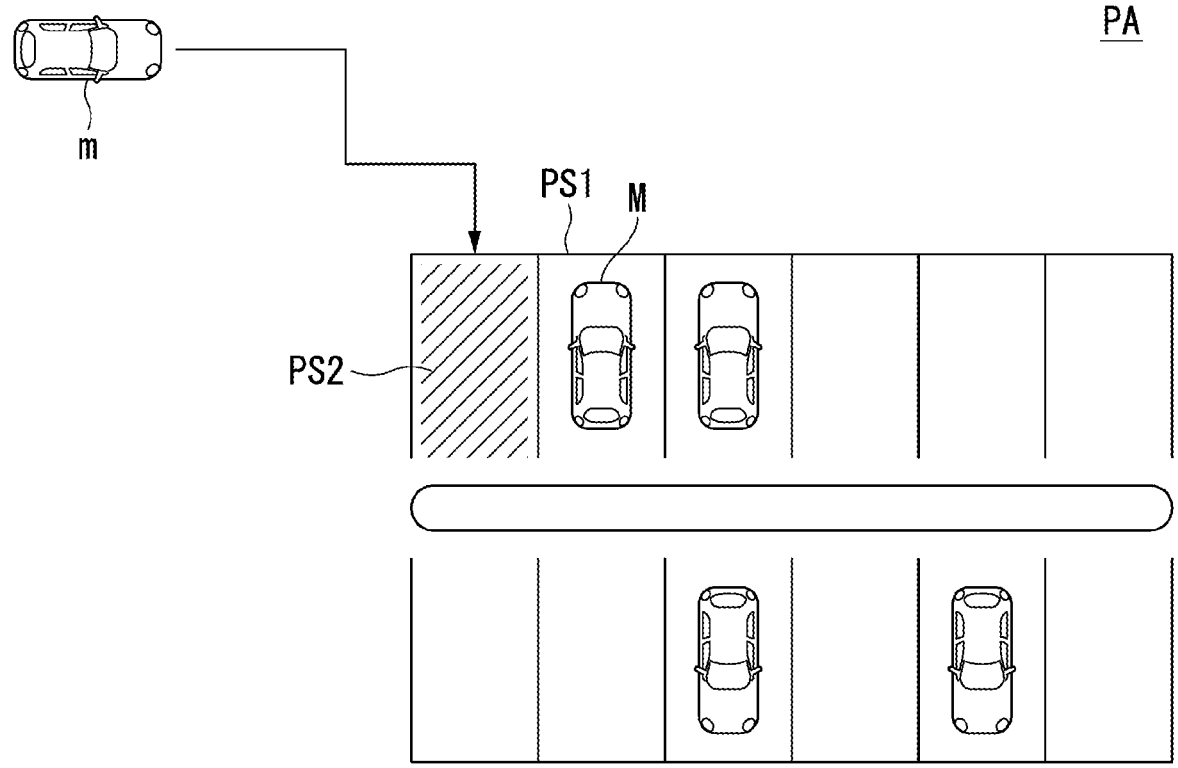
FIG. 8 is a diagram which schematically shows an example of a scene in which the parking waiting event of the automated driving control device according to the first embodiment is executed.
Figure 9:
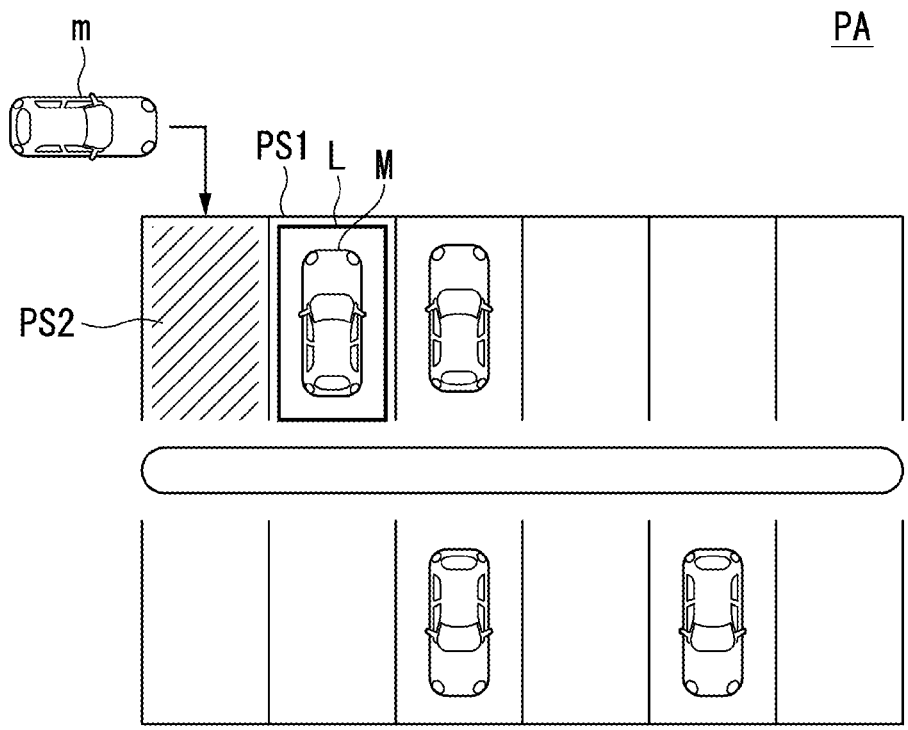
FIG. 9 is a diagram which schematically shows an example of the scene in which the parking waiting event of the automated driving control device according to the first embodiment is executed.

FIGS. 8 and 9 are diagrams which schematically show examples of a scene in which the parking waiting event of the automated driving control device 100 according to the first embodiment is executed. In the examples shown in FIGS. 8 and 9, a case in which the host vehicle M is in the parking standby state in a parking space PS1 in the parking lot PA and other vehicle m is parked in a parking space PS2 adjacent to the parking space PS1 will be described. In the example shown in FIG. 8, the light source 70 does not perform the projection of a parking line without the other vehicle recognizer 134 of the host vehicle M recognizing an approach of the other vehicle m. On the other hand, in a scene shown in FIG. 9, the other vehicle recognizer 134 of the host vehicle M recognizes the approach of the other vehicle m, and the light source 70 performs projection of a parking line L. In the example shown in FIG. 9, the rectangular parking line L larger than the outer size of the host vehicle M is projected onto the periphery of the host vehicle M when the host vehicle M is viewed from above. A driver of the other vehicle m recognizes the parking line L projected onto the periphery of this host vehicle M, thereby parking in the adjacent parking space PS2 without bringing the other vehicle m into contact with the host vehicle M.

Next, the other vehicle recognizer 134 recognizes whether parking of the other vehicle m in the adjacent parking space has been completed on the basis of the information input from the camera 10, the radar device 12, and the finder 14 via the object recognition device 16 (step S107). For example, the other vehicle recognizer 134 recognizes whether the parking of the other vehicle m has been completed on the basis of whether an operation stop state of the other vehicle m that has entered the adjacent parking space has continued for a predetermined time. When it is recognized that the parking of the other vehicle m is not completed, the other vehicle recognizer 134 continues to monitor the other vehicle m and repeatedly recognizes whether the parking of the other vehicle m in the adjacent parking space has been completed. It is assumed that the other vehicle recognizer 134 does not complete processing of recognizing whether the parking of the other vehicle m has been completed when a parking destination is changed to another parking space different from the adjacent parking space during a parking operation after the other vehicle m has started parking in the adjacent parking space, and the like. Therefore, the light source controller 174 may perform control so as to end projection of a parking line and to end processing of this flowchart when a predetermined time has elapsed from a start of the projection of a parking line. On the other hand, when the other vehicle recognizer 134 has recognized that the parking of the other vehicle m has been completed, the light source controller 174 ends the projection of a parking line (step S109). Accordingly, the processing of this flowchart ends. Note that the light source controller 174 may perform control so as to end the projection of a parking line when a predetermined time has elapsed from the start of the projection of a parking line without performing the recognition, by the other vehicle recognizer 134, of whether the parking of the other vehicle m has been completed as described above.

Figure 10:
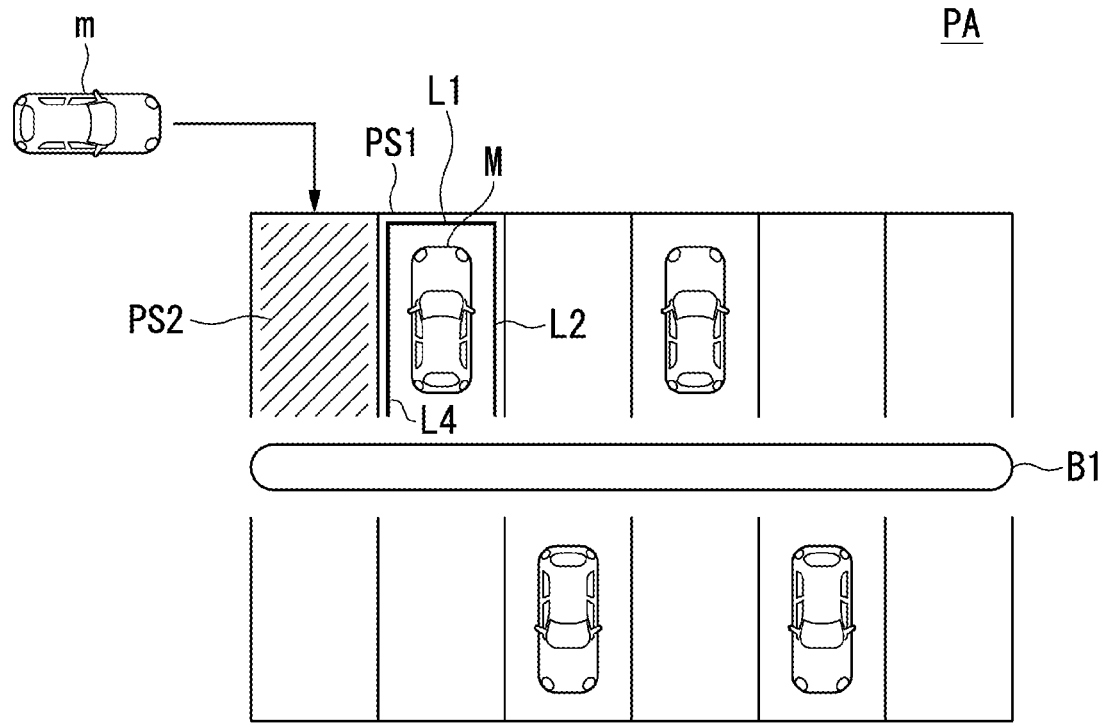
FIG. 10 is a diagram which schematically shows an example of the scene in which the parking waiting event of the automated driving control device according to the first embodiment is executed.

As shown in FIG. 10, when a partition B1 is provided between one parking space and another parking space in the parking lot PA and there is no possibility of contact with other vehicle m in a direction of the partition B1, a parking line on this partition B1 side may not be projected. For example, as shown in FIG. 10, when the host vehicle M moves backward to park in the parking space PS1 (that is, when it parks in reverse), the parking lines L1, L2, and L4 are projected from the light sources 70-1, 70-2, and 70-4, respectively, but the parking line L3 from the light source 70-3 facing the partition B1 may not be projected in the example shown in FIG. 2. Note that when the host vehicle M moves forward to park in the parking space PS1 (that is, when it parks from the front), the parking lines L2, L3, and L4 are projected from the light sources 70-2, 70-3, and 70-4, respectively, but the parking line L1 from the light source 70-1 facing the partition B1 may not be projected in the example shown in FIG. 2.

Figure 11:
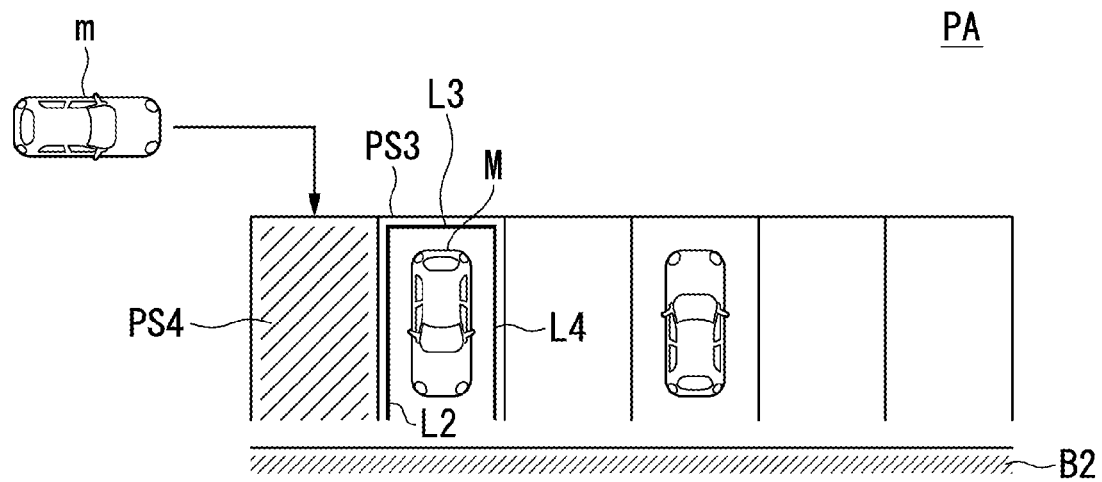
FIG. 11 is a diagram which schematically shows an example of the scene in which the parking waiting event of the automated driving control device according to the first embodiment is executed.

Similarly, also when parking in a parking space facing an end wall B2 in the parking lot PA is performed as shown in FIG. 11, a parking line on this wall B2 side may not be projected. For example, as shown in FIG. 11, when the host vehicle M moves forward to park in a parking space PS3 (that is, when it parks from the front), the parking lines L2, L3, and L4 are projected from the light sources 70-2, 70-3, and 70-4, respectively, but the parking line L1 from the light source 70-1 facing the wall B2 may not be projected in the example shown in FIG. 2. When the host vehicle M moves backward to park in the parking space PS3 (that is, when it parks in reverse), the parking lines L1, L2, and L4 are projected from the light sources 70-1, 70-2, and 70-4, respectively, but the parking line L3 from the light source 70-3 facing the wall B2 may not be projected in the example shown in FIG. 2.

In addition, a projection range of a parking line may be set in advance on the basis of an operation of the occupant of the host vehicle M. For example, arbitrary projection range setting such as allowing only projection of the parking lines L2 and L4 (that is, only on the left and right sides of the host vehicle M) or allowing only projection of the parking line L1 (that is, only in front of the host vehicle M) may also be performed in the example shown in FIG. 2.

According to the first embodiment described above, when it is recognized that the other vehicle m is approaching the host vehicle M, the automated driving control device 100 can prevent contact of the other vehicle m with the host vehicle M which is in the parking standby state by controlling the light source 70 such that the light source projects a projection image which is positioned outside the host vehicle M when the host vehicle M is viewed from above and is along at least a part of a periphery of the host vehicle M.

Second Embodiment

Hereinafter, a second embodiment will be described. An automated driving control device 100 of the second embodiment is different from in the first embodiment that it recognizes a vicinity situation of the host vehicle M that is in the parking standby state before performing the projection of a parking line, and projects a parking line only in a necessary direction. For this reason, the drawings and related descriptions described in the first embodiment will be used for configurations which are the same and the like, and detailed descriptions thereof will be omitted.

[Configuration of Automated Driving Control Device]

Figure 12:
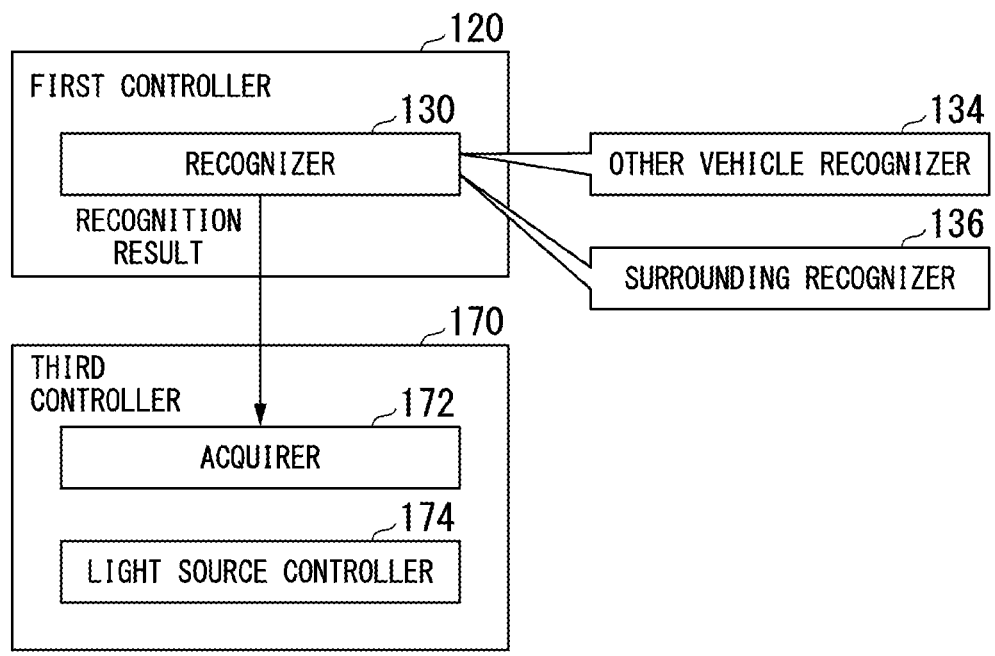
FIG. 12 is a functional configuration diagram of a first controller and a third controller according to a second embodiment.

FIG. 12 is a functional configuration diagram of the first controller 120 and the third controller 170 according to a second embodiment. The recognizer 130 included in the first controller 120 includes, for example, the other vehicle recognizer 134 and a surrounding recognizer 136 which start in the parking waiting event. The surrounding recognizer 136 recognizes a vicinity situation of the parking space of the host vehicle M on the basis of the information input from the camera 10, the radar device 12, and the finder 14 via the object recognition device 16. For example, the surrounding recognizer 136 recognizes whether any object (for example, other vehicle parked in an adjacent parking space, the partition B1 shown in FIG. 10, the wall B2 shown in FIG. 11, and the like) is present in a periphery of the parking space of the host vehicle M. Presence of an object in the periphery of the parking space of the host vehicle M indicates that an object is present within a distance (for example, within a width smaller than a vehicle width) within which other vehicle may not enter. The recognizer 130 outputs a result of recognition of other vehicle performed by the other vehicle recognizer 134 and a result of recognition of the vicinity situation performed by the surrounding recognizer 136 to the third controller 170.

The third controller 170 controls the light source 70 such that the light source projects a projection image which is positioned outside the host vehicle M when the host vehicle M is viewed from above and is along at least part of a periphery of the host vehicle M on the basis of both the recognition result of other vehicle performed by the other vehicle recognizer 134 and the recognition result of the vicinity situation performed by the surrounding recognizer 136.

When the recognition result of other vehicle performed by the other vehicle recognizer 134 indicates an approach of other vehicle m and the recognition result of the vicinity situation performed by the surrounding recognizer 136 indicates that an object is present in a specific direction from the host vehicle M, the light source controller 174 of the third controller 170 controls the light source 70 such that the light source projects a projection image which is positioned outside the host vehicle M when the host vehicle M is viewed from above and is along at least part of a periphery of the host vehicle M. Here, the light source controller 174 controls the light source such that a parking line in an area facing an object recognized by the surrounding recognizer 136 described above is not projected. For example, the light source controller 174 controls the light source 70 such that at least one of four sides of a rectangle larger than the outer size of the host vehicle M is projected onto the periphery of the host vehicle M when the host vehicle M is viewed from above.

The light source controller 174 determines a projection position of a parking line on the basis of a parking interval between the host vehicle M and other vehicle m (an example of the "third vehicle") parked (stopped) adjacent to the host vehicle M, which is included in the recognition result of the vicinity situation performed by the surrounding recognizer 136. For example, when a rectangle larger than the outer size of the host vehicle M is projected onto the periphery of the host vehicle M when the host vehicle M is viewed from above, the light source controller 174 calculates a size of the rectangle on the basis of the parking interval between the host vehicle M and other vehicle m parked adjacent to the host vehicle M. For example, when the parking interval between the host vehicle M and the other vehicle m parked adjacent to the host vehicle M is D, the size of the rectangle is calculated such that a parking line is projected onto a position separated from the host vehicle M by a half (D/2) of this parking interval.

[Operation Flow of Parking Waiting Event]

Figure 13:
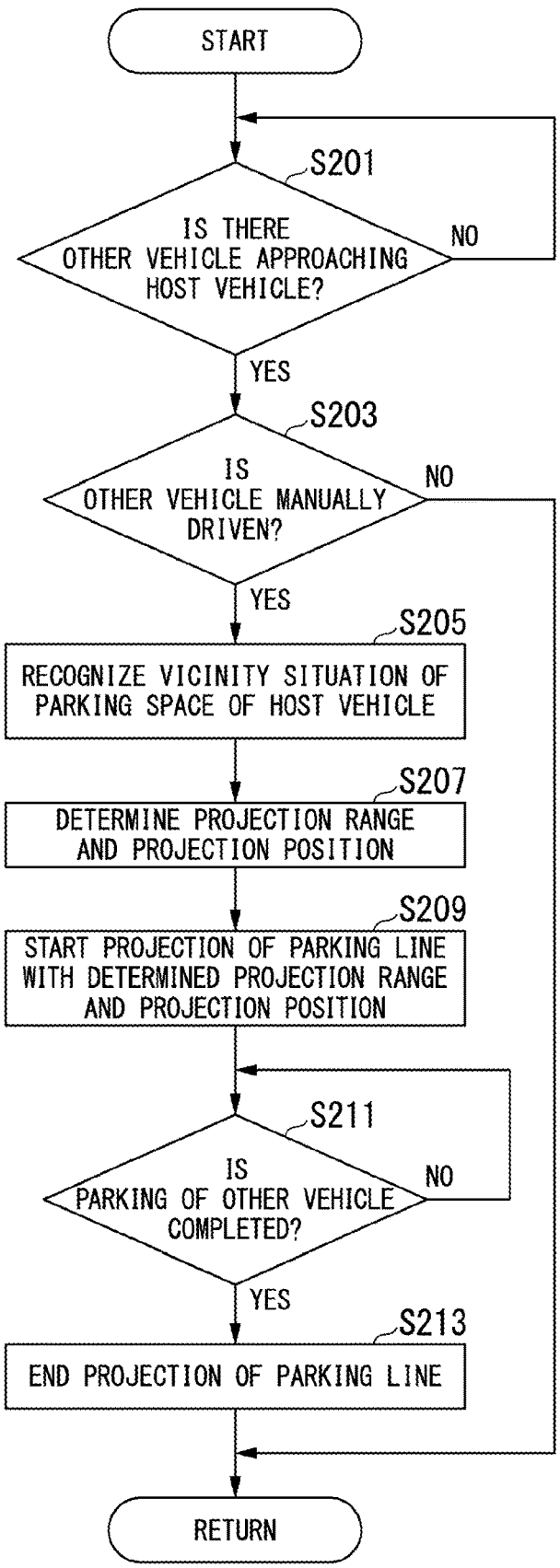
FIG. 13 is a diagram which shows an example of an operation flow of a parking waiting event of an automated driving control device according to the second embodiment.

The operation of the parking waiting event will be described. FIG. 13 is a diagram which shows an example of an operation flow of the parking waiting event of the automatic driving control device 100 according to the second embodiment. First, the other vehicle recognizer 134 recognizes whether other vehicle m is approaching the host vehicle M on the basis of the information input from the camera 10, the radar device 12, and the finder 14 via the object recognition device 16 (step S201). When it is recognized that other vehicle m is not approaching the host vehicle M, the other vehicle recognizer 134 continues to monitor the other vehicle m and recognizes whether the other vehicle m is approaching the host vehicle M.

On the other hand, when it is recognized that other vehicle m is approaching the adjacent parking space, the other vehicle recognizer 134 further recognizes whether an approaching other vehicle m is manually driven (step S203). The recognition of whether the vehicle is manually driven, that is, recognition of whether the vehicle is in a manual driving or automated driving, is performed by, for example, confirming a driving state of the other vehicle m by communication between the host vehicle M and the other vehicle m, and confirming whether an occupant is present in the other vehicle m on the basis of an image captured by the camera 10, whether the other vehicle is in a hands-off state, and the like. When it is recognized that the approaching other vehicle m is not manually driven, the other vehicle recognizer 134 recognizes whether the other vehicle m is approaching the host vehicle M again without performing subsequent processing of the present flowchart (step S201). Note that the other vehicle recognizer 134 may not perform the recognition of whether the vehicle is manually driven described above.

On the other hand, when it is recognized by the other vehicle recognizer 134 that the other vehicle m is manually driven, the surrounding recognizer 136 recognizes a vicinity situation such as whether any object is present in the periphery of the parking space of the host vehicle M (step S205). Next, the light source controller 174 determines the projection range and projection position of a parking line projected onto outside the host vehicle M on the basis of a result of the recognition performed by the surrounding recognizer 136 (step S207). For example, the light source controller 174 determines the projection range such that a parking line in a range facing an object recognized by the surrounding recognizer 136 described above is excluded. The light source controller 174 determines the projection position of a parking line on the basis of an interval between to the host vehicle M and other vehicles parked adjacent to the host vehicle M. Next, the light source controller 174 starts the projection of a parking line with the determined projection range and projection position by controlling the light source 70 (step S209).

Figure 14:
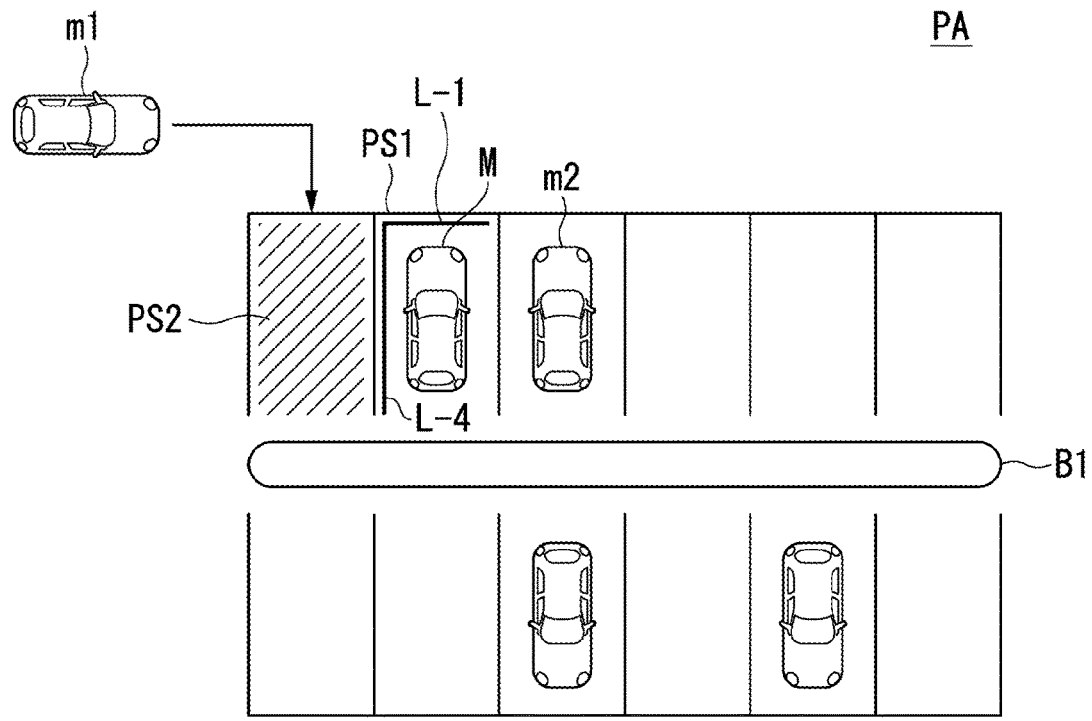
FIG. 14 is a diagram which schematically shows an example of a scene in which the parking waiting event of the automated driving control device according to the second embodiment is executed.
Figure 15:
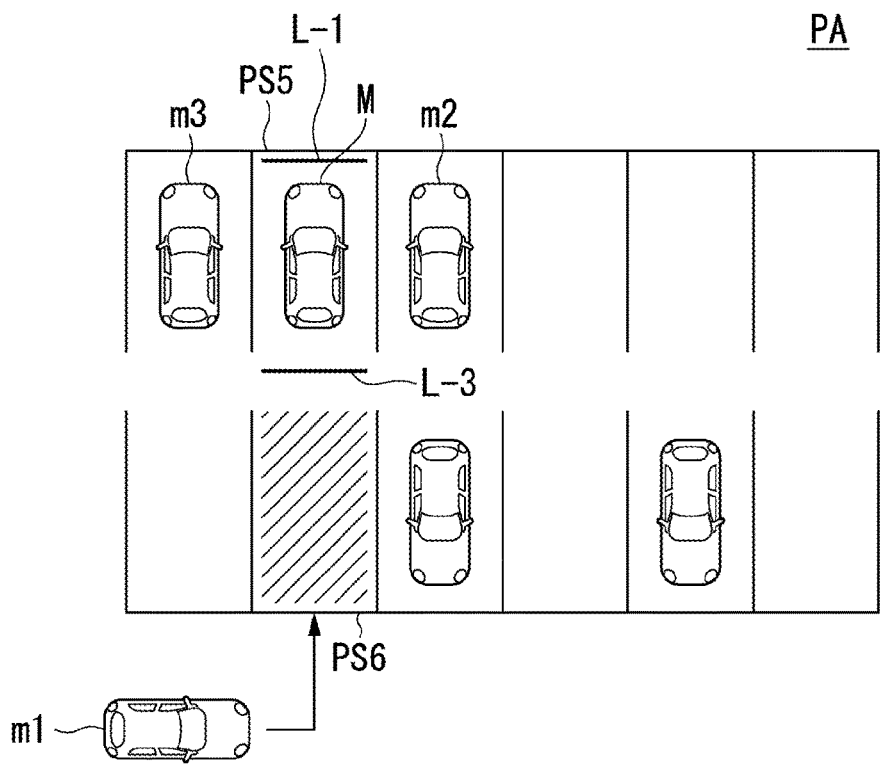
FIG. 15 is a diagram which schematically shows an example of the scene in which the parking waiting event of the automated driving control device according to the second embodiment is executed.

FIGS. 14 and 15 are diagrams which schematically show examples of a scene in which the parking waiting event of the automatic driving control device 100 according to the second embodiment is executed. In the example shown in FIG. 14, a scene in which the host vehicle M is in the parking standby state in a parking space PS1 in the parking lot PA and other vehicle m1 parks in an adjacent parking space PS2 on a left side of the parking space PS1 when the host vehicle M is viewed from above will be described. In this example, the surrounding recognizer 136 of the host vehicle M recognizes other vehicle m2 which is in the parking standby state in a right direction when the host vehicle M is viewed from above and recognizes the partition B1 at the back. For this reason, when the light source controller 174 determines a projection range excluding a parking line on a side in which the object recognized by the surrounding recognizer 136 is present, that is, the front and left side of the host vehicle M when the host vehicle M is viewed from above, as the projection range, and controls the light source 70 such that only the lines L1 and L4 are projected.

In the example shown in FIG. 15, a scene in which the host vehicle M is in the parking standby state in a parking space PS5 in the parking lot PA, and other vehicle m1 parks in an adjacent parking space PS6 on a lower side (on a rear side of the host vehicle M that is in the parking standby state) of the parking space PS5 when the host vehicle M is viewed from above will be described. In this example, the surrounding recognizer 136 of the host vehicle M recognizes other vehicle m2 that is in the parking standby state in a right direction and recognizes other vehicle m3 that is in the parking standby state in a left direction when the host vehicle M is viewed from above. For this reason, the light source controller 174 determines a projection range excluding a parking line on a side in which the object recognized by the surrounding recognizer 136 is present, that is, the front and rear of the host vehicle M when the host vehicle M is viewed from above, as the projection range, and controls the light source 70 such that only the lines L1 and L3 are projected.

Next, the other vehicle recognizer 134 recognizes whether parking of other vehicle m in the adjacent parking space has been completed on the basis of the information input from the camera 10, the radar device 12, and the finder 14 via the object recognition device 16 (step S211). When it is recognized that the parking of the other vehicle is not completed, the other vehicle recognizer 134 continues to monitor the other vehicle m and recognizes whether the parking of the other vehicle m in the adjacent parking space has been completed. It is assumed that the other vehicle recognizer 134 does not complete the processing of recognizing whether the parking of the other vehicle m has been completed when a parking destination is changed to another parking space different from the adjacent parking space during a parking operation after the other vehicle m has started parking to the adjacent parking space, and the like. Therefore, the light source controller 174 may perform control so as to end projection of a parking line and to end processing of this flowchart when a predetermined time has elapsed from a start of the projection of a parking line. On the other hand, when the other vehicle recognizer 134 has recognized that the parking of the other vehicle m has been completed, the projection of a parking line ends (step S213). Accordingly, the processing of this flowchart ends. The light source controller 174 may perform control so as to end the projection of a parking line when a predetermined time has elapsed from the start of the projection of a parking line without performing the recognition, by the other vehicle recognizer 134, of whether the parking of the other vehicle m has been completed as described above.

Figure 16:
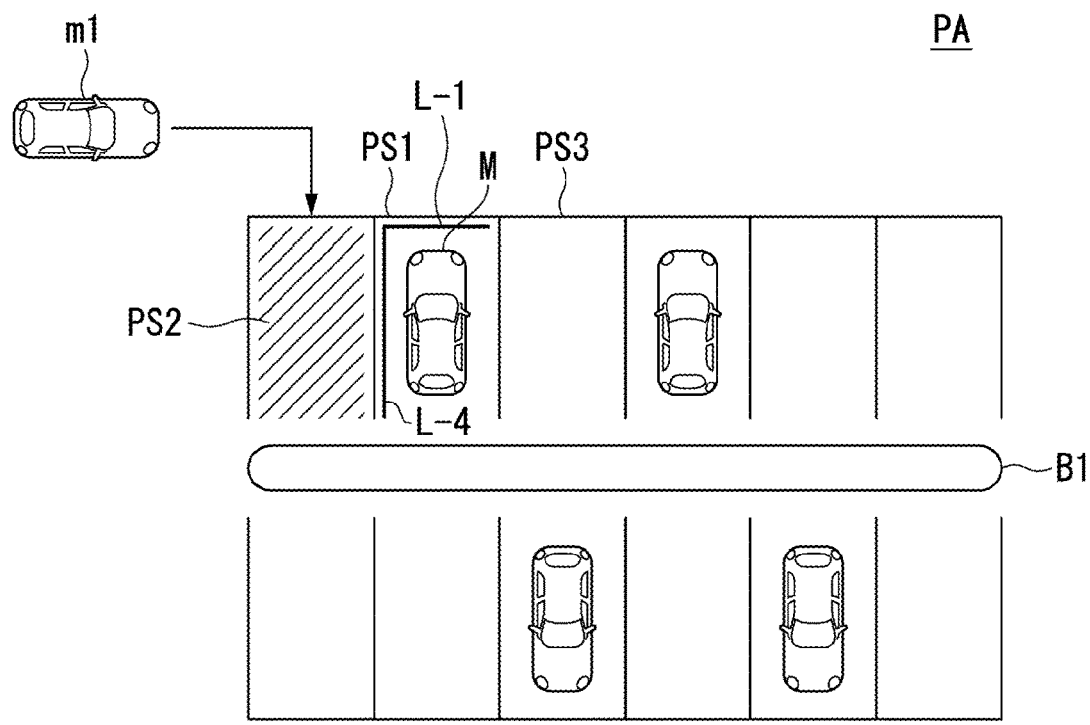
FIG. 16 is a diagram which schematically shows an example of the scene in which the parking waiting event of the automated driving control device according to the second embodiment is executed.

The surrounding recognizer 136 may recognize an operation direction and a parking-scheduled space of other vehicle m that performs parking on the basis of the information input from the camera 10, the radar device 12, and the finder 14 via the object recognition device 16, and only parking lines on sides of an adjacent parking space in which the other vehicle m is scheduled to park are projected. For example, as shown in FIG. 16, when the host vehicle M is viewed from above, if both the parking space PS2 on a left side of the parking space PS1 in which the host vehicle M is parking and the parking space PS3 on the right side are empty, the other vehicle recognizer 134 recognizes the parking space PS2 in which other vehicle m1 is scheduled to park after recognizing the operation direction of the other vehicle m1 that performs parking, and the light source controller 174 may project only parking lines required to be projected at the time of parking in the recognized parking space PS2 (parking lines included in a range on a side of the recognized parking space PS2 when viewed from the host vehicle M is, for example, the parking lines L1 and L4) or a parking line facing the recognized parking space PS2 (for example, the parking line L4).

Figure 17:
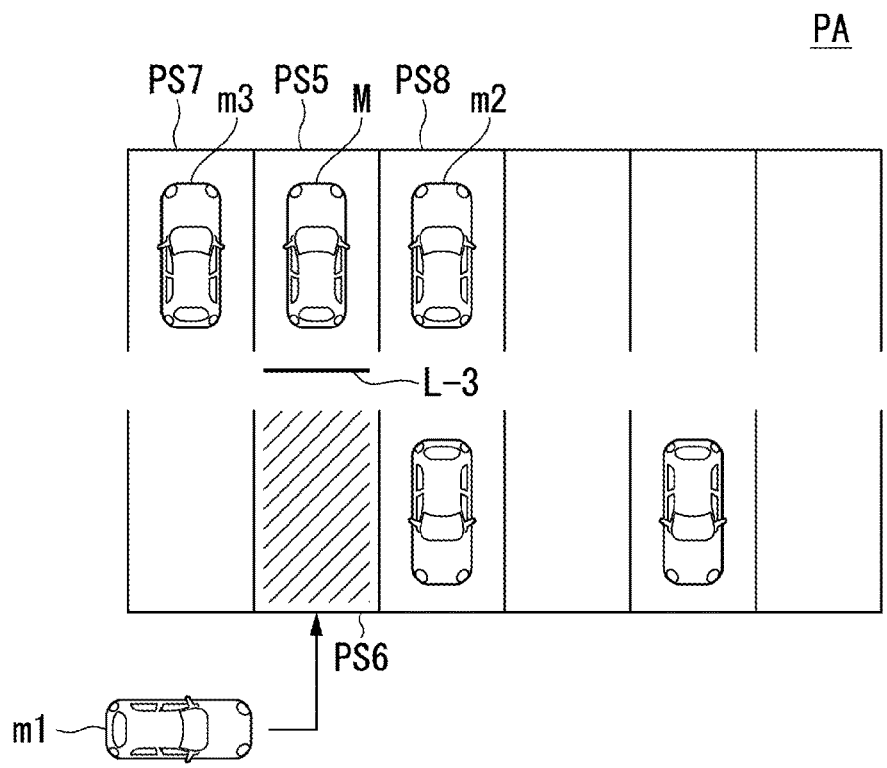
FIG. 17 is a diagram which schematically shows an example of the scene in which the parking waiting event of the automated driving control device according to the second embodiment is executed.

As shown in FIG. 17, when the host vehicle M is viewed from above, if the other vehicle m1 parks in an adjacent parking space PS6 on a lower side (the rear side of the host vehicle M that is in the parking standby state) of the parking space PS5 when other vehicles m3 and m2 park in each of right and left parking spaces PS7 and PS8 of the parking space PS5 in which the host vehicle M parks, the other vehicle recognizer 134 may recognize the parking space PS6 in which the other vehicle m1 is scheduled to park after recognizing the operation direction of the other vehicle m1 that performs parking, and the light source controller 174 may project only the parking line L3 on a side of the recognized parking space PS6.

According to the second embodiment described above, when it is recognized that other vehicle m is approaching the host vehicle M, the automated driving control device 100 controls the light source 70 such that the light source 70 projects a projection image which is positioned outside the host vehicle M when the host vehicle M is viewed from above and is along at least part of a periphery of the host vehicle M, thereby preventing a contact of the other vehicle m with the host vehicle M that is in the parking standby state. The automated driving control device 100 recognizes the vicinity situation of the host vehicle M that is in the parking standby state and projects a parking line only in a necessary direction, thereby reducing power consumption required for projection. The automated driving control device 100 adjusts the projection position of a parking line, thereby projecting a parking line onto an appropriate position according to the environment and vicinity situation of a parking lot.

When a parking lot in which the host vehicle M parks is a parking lot dedicated to vehicles that perform autonomous parking, the automated driving control device 100 may not perform the processing of projecting a parking line described above. For example, when information indicating that a parking lot is dedicated to vehicles that perform autonomous parking is received from the parking lot management device 400, the automated driving control device 100 may not perform the processing of projecting a parking line described above. Alternatively, the automated driving control device 100 may not perform the processing of projecting a parking line described above on the basis of an operation input by the occupant of the host vehicle M via the HMI 30.

The automated driving control device 100 may control a sound generator (not shown) such as a speaker to generate a sound (warning sound) when other vehicle m exceeds a predetermined threshold value and has approached the host vehicle M.

[Hardware Configuration]

Figure 18:
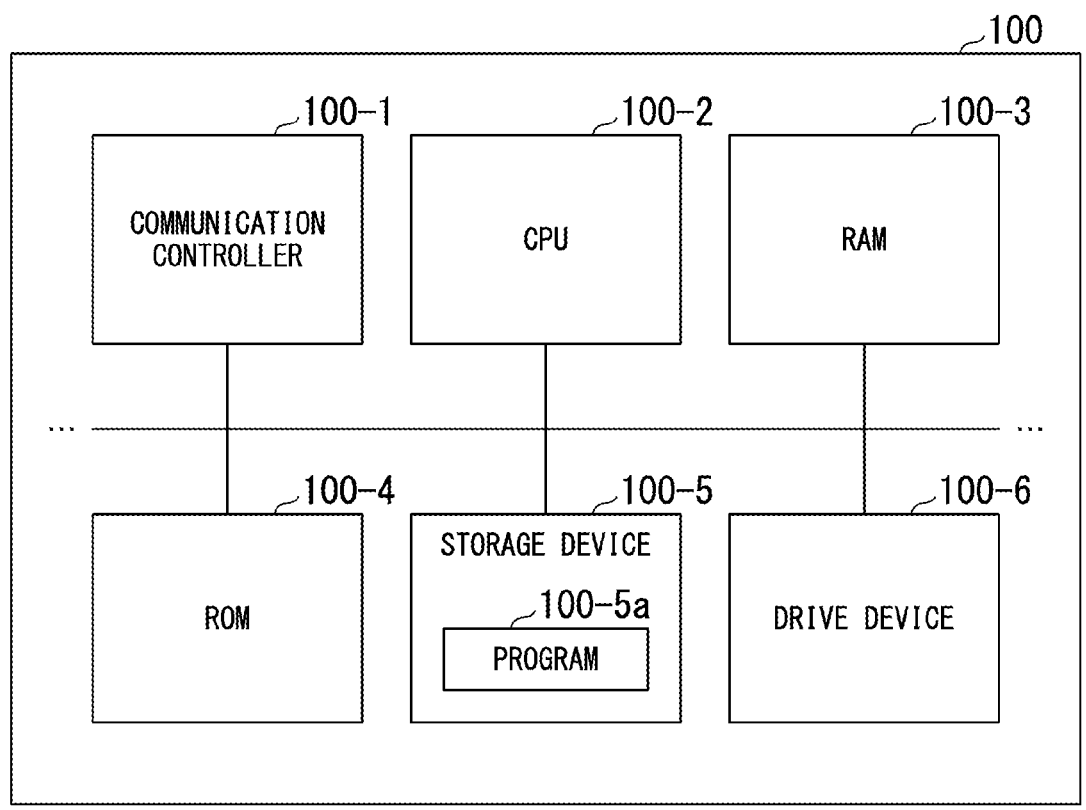
FIG. 18 is a diagram which shows an example of a hardware configuration of the automated driving control device of the embodiment.

FIG. 18 is a diagram which shows an example of a hardware configuration of the automated driving control device 100 of the embodiment. As shown in FIG. 18, the automated driving control device 100 (computer) is configured by a communication controller 100-1, a CPU 100-2, a random access memory (RAM) 100-3 used as a working memory, a read only memory (ROM) 100-4 that stores a booting program and the like, a storage device 100-5 such as a flash memory or a hard disk drive (HDD), a drive device 100-6, and the like being connected to each other by an interval bus or a dedicated communication line. The communication controller 100-1 communicates with components other than the automated driving control device 100. The storage device 100-5 stores a program 100-5a executed by the CPU 100-2. This program is loaded in the RAM 100-3 by a direct memory access (DMA) controller (not shown) or the like, and is executed by the CPU 100-2. As a result, some or all of the first controller 120, the second controller 160, and the third controller 170 are realized.

The embodiment described above can be expressed as follows. A vehicle control device which is mounted on a first vehicle and includes a light source configured to project light onto an outside of the vehicle, a storage device in which a program is stored, and a hardware processor is configured to control, when the first vehicle is stopped, the light source by the hardware processor executing the program stored in the storage device such that the light source projects a projection image which is positioned outside the first vehicle when the first vehicle is viewed from above and is along at least part of a periphery of the first vehicle when the first vehicle is stopped.

As described above, the form of the present invention has been described using the embodiments, but the present invention is not limited to these embodiments, and various modifications and substitutions can be made in a range not departing from the gist of the present invention.

What is claimed is:

1. A vehicle control device which is mounted on a first vehicle, the vehicle control device comprising:
    a light source configured to project light outside of a vehicle;
    a light source controller configured to control the light source to project a projection image which is positioned outside the first vehicle viewed from above and is along at least part of a periphery of the first vehicle in a case where the first vehicle is stopped; and
    a recognizer configured to recognize whether a second vehicle is approaching the first vehicle, whether the second vehicle is being manually driven, and whether the second vehicle is being automatically driven,
    wherein the light source controller is configured to control the light source to project the projection image in a case where the recognizer recognizes that the second vehicle is approaching the first vehicle and the second vehicle is being manually driven, and
    the light source controller is configured to control the light source not to project the projection image in a case where the recognizer recognizes that the second vehicle is approaching the first vehicle and the second vehicle is being automatically driven.

2. The vehicle control device according to claim 1,
    wherein the projection image constitutes at least part of a rectangle shape, and
    the light source controller is configured to control the light source to project at least one of four sides of the rectangle in a case where the recognizer recognizes that the second vehicle is approaching the first vehicle.

3. The vehicle control device according to claim 1,
    wherein the recognizer is further configured to recognize a vicinity situation of the first vehicle, and
    in a case where the recognizer recognizes that an object is present in a vicinity of a stop position of the first vehicle, the light source controller is configured to control the light source not to perform a projection of the projection image within a range facing the object.

4. The vehicle control device according to claim 1,
    wherein the recognizer is further configured to recognize a parking space in which the second vehicle to be park on the basis of an operation direction of the second vehicle, and
    the light source controller is configured to control the light source to project the projection image onto a side of the parking space recognized by the recognizer as viewed from the first vehicle.

5. The vehicle control device according to claim 1,
    wherein the light source controller is configured to determine a projection position of the projection image on the basis of an interval between a third vehicle stopped to be adjacent to the first vehicle and the first vehicle.

6. The vehicle control device according to claim 1,
    wherein the light source controller is configured to control the light source to project the projection image using visible light.

7. A vehicle control method comprising:
    controlling, by a computer of a vehicle control device which is mounted on a first vehicle and comprises a light source, the light source to project a projection image which is positioned outside the first vehicle viewed from above and is along at least a part of a periphery of the first vehicle in a case where the first vehicle is stopped; and
    recognizing whether a second vehicle is approaching the first vehicle, whether the second vehicle is being manually driven, and whether the second vehicle is being automatically driven,
    wherein
    the controlling of the light source to project the projection image is performed in a case where it is recognized that the second vehicle is approaching the first vehicle and the second vehicle is being manually driven, and
    the controlling of the light source to project the projection image is not performed in a case where it is recognized that the second vehicle is approaching the first vehicle and the second vehicle is being automatically driven.

8. A computer readable non-transitory storage medium which stores a program causing a computer of a vehicle control device that is mounted on a first vehicle and comprise a light source to
    control the light source to project a projection image which is positioned outside the first vehicle viewed from above and is along at least a part of a periphery of the first vehicle in a case where the first vehicle is stopped; and
    recognize whether a second vehicle is approaching the first vehicle, whether the second vehicle is being manually driven, and whether the second vehicle is being automatically driven,
    wherein
    the controlling of the light source to project the projection image is performed in a case where it is recognized that the second vehicle is approaching the first vehicle and the second vehicle is being manually driven, and
    the controlling of the light source to project the projection image is not performed in a case where it is recognized that the second vehicle is approaching the first vehicle and the second vehicle is being automatically driven.

* * * * *